US008272822B2

(12) United States Patent
Casazza

(10) Patent No.: US 8,272,822 B2
(45) Date of Patent: Sep. 25, 2012

(54) WIND POWER TURBINE BLADE PACKING AND PACKING METHOD

(75) Inventor: Matteo Casazza, Val di Vizze (IT)

(73) Assignee: Wilic S.AR.L., Luxembourg (LU)

( * ) Notice: Subject to any disclaimer, the term of this patent is extended or adjusted under 35 U.S.C. 154(b) by 210 days.

(21) Appl. No.: 12/697,627

(22) Filed: Feb. 1, 2010

(65) Prior Publication Data
US 2010/0193394 A1   Aug. 5, 2010

(30) Foreign Application Priority Data

Jan. 30, 2009   (IT) .............................. MI2009A0119

(51) Int. Cl.
*B63B 25/24*   (2006.01)
(52) U.S. Cl. ...................................................... 410/155
(58) Field of Classification Search .................. 410/155, 410/117, 118, 119, 97, 44; 206/522; 53/409
See application file for complete search history.

(56) References Cited

U.S. PATENT DOCUMENTS

| | | | |
|---|---|---|---|
| 1,827,322 A * | 10/1931 | Lindermann | 206/522 |
| 1,894,357 A | 1/1933 | Manikowske et al. | |
| 1,948,854 A | 2/1934 | Heath | |
| 1,979,813 A | 11/1934 | Reis | |
| 2,006,172 A | 6/1935 | Klappauf | |
| 2,040,218 A | 5/1936 | Soderberg | |
| 2,177,801 A | 10/1939 | Erren | |
| 2,469,734 A | 5/1949 | Ledwith | |
| 2,496,897 A | 2/1950 | Strickland | |
| 2,655,611 A | 10/1953 | Sherman | |
| 2,739,253 A | 3/1956 | Plumb | |
| 2,806,160 A | 9/1957 | Brainard | |
| 2,842,214 A | 7/1958 | Prewitt | |
| 2,903,610 A | 9/1959 | Bessiere | |
| 3,004,782 A | 10/1961 | Meermans | |
| 3,072,813 A | 1/1963 | Reijnst et al. | |
| 3,083,311 A | 3/1963 | Krasnow | |
| 3,131,942 A | 5/1964 | Ertaud | |
| 3,168,686 A | 2/1965 | King et al. | |
| 3,221,195 A | 11/1965 | Hoffmann | |
| 3,363,910 A | 1/1968 | Toronchuk | |

(Continued)

FOREIGN PATENT DOCUMENTS

CA   2404939   4/2004

(Continued)

OTHER PUBLICATIONS

Maxime R. Dubous, Henk Polinder, Study of TFPM Machines with Toothed Rotor Applied to Direct-Drive Generators for Wind Turbines, 2004.
Variable Speed Gearless Wind Turbine (website), http://www.mhi.cojp/msmw/mw/en/gearless.html, viewed on Sep. 22, 2006.
European Search Report from corresponding foreign application dated Mar. 1, 2010.

*Primary Examiner* — H Gutman
(74) *Attorney, Agent, or Firm* — Neal, Gerber & Eisenberg LLP

(57) ABSTRACT

A packing for wind power turbine blades having at least one inflatable annular structure, which in turn has a flat outer supporting wall, and inner clamping walls for clamping a blade in a designated position with respect to the outer supporting wall. A method of packing wind power turbine blades which includes applying at least one inflatable annular structure about a blade, and causing the at least one inflatable annular structure to inflate to distend at least one outer supporting wall and at least one inner clamping wall to clamp the blade.

17 Claims, 4 Drawing Sheets

U.S. PATENT DOCUMENTS

| | | | |
|---|---|---|---|
| 3,364,523 A | 1/1968 | Schippers | |
| 3,392,910 A | 7/1968 | Tanzberger | |
| 3,468,548 A | 9/1969 | Webb | |
| 3,700,247 A | 10/1972 | Butler et al. | |
| 3,724,861 A | 4/1973 | Lesiecki | |
| 3,746,349 A | 7/1973 | Smale et al. | |
| 3,748,089 A | 7/1973 | Boyer et al. | |
| 3,789,252 A | 1/1974 | Abegg | |
| 3,841,643 A | 10/1974 | McLean | |
| 3,860,843 A | 1/1975 | Kawasaki et al. | |
| 3,942,026 A | 3/1976 | Carter | |
| 3,963,247 A | 6/1976 | Nommensen | |
| 3,968,969 A | 7/1976 | Mayer et al. | |
| 4,022,479 A | 5/1977 | Orlowski | |
| 4,061,926 A | 12/1977 | Peed | |
| 4,087,698 A | 5/1978 | Myers | |
| 4,190,158 A * | 2/1980 | Ambrose | 206/522 |
| 4,240,556 A * | 12/1980 | Field | 206/522 |
| 4,273,343 A | 6/1981 | Visser | |
| 4,285,431 A * | 8/1981 | Wickman | 206/522 |
| 4,289,970 A | 9/1981 | Deibert | |
| 4,291,235 A | 9/1981 | Bergey, Jr. et al. | |
| 4,292,532 A | 9/1981 | Leroux | |
| 4,336,649 A | 6/1982 | Glaser | |
| 4,339,874 A | 7/1982 | Mc'Carty et al. | |
| 4,348,604 A | 9/1982 | Thode | |
| 4,350,897 A | 9/1982 | Benoit | |
| 4,354,126 A | 10/1982 | Yates | |
| 4,368,895 A | 1/1983 | Okamoto et al. | |
| 4,398,773 A | 8/1983 | Boden et al. | |
| 4,452,046 A | 6/1984 | Valentin | |
| 4,482,831 A | 11/1984 | Notaras et al. | |
| 4,490,093 A | 12/1984 | Chertok et al. | |
| 4,517,483 A | 5/1985 | Hucker et al. | |
| 4,517,484 A | 5/1985 | Dacier | |
| 4,521,026 A | 6/1985 | Eide | |
| 4,585,950 A | 4/1986 | Lund | |
| 4,613,779 A | 9/1986 | Meyer | |
| 4,638,200 A | 1/1987 | Le Corre et al. | |
| 4,648,801 A | 3/1987 | Wilson | |
| 4,694,654 A | 9/1987 | Kawamura | |
| 4,700,096 A | 10/1987 | Epars | |
| 4,714,852 A | 12/1987 | Kawada et al. | |
| 4,720,640 A | 1/1988 | Anderson et al. | |
| 4,722,661 A | 2/1988 | Mizuno | |
| 4,724,348 A | 2/1988 | Stokes | |
| 4,761,590 A | 8/1988 | Kaszman | |
| 4,792,712 A | 12/1988 | Stokes | |
| 4,801,244 A | 1/1989 | Stahl | |
| 4,866,321 A | 9/1989 | Blanchard et al. | |
| 4,900,965 A | 2/1990 | Fisher | |
| 4,906,060 A | 3/1990 | Claude | |
| 4,973,868 A | 11/1990 | Wust | |
| 4,976,587 A | 12/1990 | Johnston et al. | |
| 5,004,944 A | 4/1991 | Fisher | |
| 5,063,318 A | 11/1991 | Anderson | |
| 5,090,711 A | 2/1992 | Becker | |
| 5,091,668 A | 2/1992 | Cuenot et al. | |
| 5,177,388 A | 1/1993 | Hotta et al. | |
| 5,191,255 A | 3/1993 | Kloosterhouse et al. | |
| 5,275,139 A | 1/1994 | Rosenquist | |
| 5,280,209 A | 1/1994 | Leupold et al. | |
| 5,281,094 A | 1/1994 | McCarty et al. | |
| 5,298,827 A | 3/1994 | Sugiyama | |
| 5,302,876 A | 4/1994 | Iwamatsu et al. | |
| 5,311,092 A | 5/1994 | Fisher | |
| 5,315,159 A | 5/1994 | Gribnau | |
| 5,331,238 A | 7/1994 | Johnsen | |
| 5,410,997 A | 5/1995 | Rosenquist | |
| 5,419,683 A | 5/1995 | Peace | |
| 5,456,579 A | 10/1995 | Olson | |
| 5,483,116 A | 1/1996 | Kusase et al. | |
| 5,506,453 A | 4/1996 | McCombs | |
| 5,579,800 A | 12/1996 | Walker | |
| 5,609,184 A | 3/1997 | Apel et al. | |
| 5,663,600 A | 9/1997 | Baek et al. | |
| 5,670,838 A | 9/1997 | Everton | |
| 5,696,419 A | 12/1997 | Rakestraw et al. | |
| 5,704,567 A | 1/1998 | Maglieri | |
| 5,746,576 A | 5/1998 | Bayly | |
| 5,777,952 A | 7/1998 | Nishimura et al. | |
| 5,783,894 A | 7/1998 | Wither | |
| 5,793,144 A | 8/1998 | Kusase et al. | |
| 5,798,632 A | 8/1998 | Muljadi | |
| 5,801,470 A | 9/1998 | Johnson et al. | |
| 5,811,908 A | 9/1998 | Iwata et al. | |
| 5,814,914 A | 9/1998 | Caamaño | |
| 5,844,333 A | 12/1998 | Sheerin | |
| 5,844,341 A | 12/1998 | Spooner et al. | |
| 5,857,762 A | 1/1999 | Schwaller | |
| 5,886,441 A | 3/1999 | Uchida et al. | |
| 5,889,346 A | 3/1999 | Uchida et al. | |
| 5,894,183 A | 4/1999 | Borchert | |
| 5,925,964 A | 7/1999 | Kusase et al. | |
| 5,952,755 A | 9/1999 | Lubas | |
| 5,961,124 A | 10/1999 | Muller | |
| 5,973,435 A | 10/1999 | Irie et al. | |
| 5,986,374 A | 11/1999 | Kawakami | |
| 5,986,378 A | 11/1999 | Caamaño | |
| 6,013,968 A | 1/2000 | Lechner et al. | |
| 6,037,692 A | 3/2000 | Miekka et al. | |
| 6,038,834 A | 3/2000 | Haley | |
| 6,064,123 A | 5/2000 | Gislason | |
| 6,067,227 A | 5/2000 | Katsui et al. | |
| 6,089,536 A | 7/2000 | Watanabe et al. | |
| 6,093,984 A | 7/2000 | Shiga et al. | |
| 6,127,739 A | 10/2000 | Appa | |
| 6,139,188 A | 10/2000 | Marzano | |
| 6,172,429 B1 | 1/2001 | Russell | |
| 6,177,746 B1 | 1/2001 | Tupper et al. | |
| 6,193,211 B1 | 2/2001 | Watanabe et al. | |
| 6,194,799 B1 | 2/2001 | Miekka et al. | |
| 6,215,199 B1 | 4/2001 | Lysenko et al. | |
| 6,232,673 B1 | 5/2001 | Schoo et al. | |
| 6,278,197 B1 | 8/2001 | Appa | |
| 6,285,090 B1 | 9/2001 | Brutsaert et al. | |
| 6,326,711 B1 | 12/2001 | Yamaguchi et al. | |
| 6,365,994 B1 | 4/2002 | Watanabe et al. | |
| 6,373,160 B1 | 4/2002 | Schrödl | |
| 6,376,956 B1 | 4/2002 | Hosoya | |
| 6,378,839 B2 | 4/2002 | Watanabe et al. | |
| 6,384,504 B1 | 5/2002 | Elrhart et al. | |
| 6,417,578 B1 | 7/2002 | Chapman et al. | |
| 6,428,011 B1 | 8/2002 | Oskouei | |
| 6,452,287 B1 | 9/2002 | Looker | |
| 6,452,301 B1 | 9/2002 | Van Dine et al. | |
| 6,455,976 B1 | 9/2002 | Nakano | |
| 6,472,784 B2 | 10/2002 | Miekka et al. | |
| 6,474,653 B1 | 11/2002 | Hintenlang et al. | |
| 6,476,513 B1 | 11/2002 | Gueorguiev | |
| 6,483,199 B2 | 11/2002 | Umemoto et al. | |
| 6,492,743 B1 | 12/2002 | Appa | |
| 6,492,754 B1 | 12/2002 | Weiglhofer et al. | |
| 6,499,532 B1 | 12/2002 | Williams | |
| 6,504,260 B1 | 1/2003 | Debleser | |
| 6,515,390 B1 | 2/2003 | Lopatinsky et al. | |
| 6,520,737 B1 | 2/2003 | Fischer et al. | |
| 6,548,932 B1 | 4/2003 | Weiglhofer et al. | |
| 6,590,312 B1 | 7/2003 | Seguchi et al. | |
| 6,603,232 B2 | 8/2003 | Van Dine et al. | |
| 6,617,747 B1 | 9/2003 | Petersen | |
| 6,629,358 B2 | 10/2003 | Setiabudi et al. | |
| 6,664,692 B1 | 12/2003 | Kristoffersen | |
| 6,676,122 B1 | 1/2004 | Wobben | |
| 6,683,397 B2 | 1/2004 | Gauthier et al. | |
| 6,700,260 B2 | 3/2004 | Hsu et al. | |
| 6,700,288 B2 | 3/2004 | Smith | |
| 6,707,224 B1 | 3/2004 | Petersen | |
| 6,720,688 B1 | 4/2004 | Schiller | |
| 6,727,624 B2 | 4/2004 | Morita et al. | |
| 6,746,217 B2 | 6/2004 | Kim et al. | |
| 6,759,758 B2 | 7/2004 | Martinez | |
| 6,762,525 B1 | 7/2004 | Maslov et al. | |
| 6,781,276 B1 | 8/2004 | Stiesdal et al. | |
| 6,784,564 B1 | 8/2004 | Wobben | |
| 6,794,781 B2 | 9/2004 | Razzell et al. | |
| 6,828,710 B1 | 12/2004 | Gabrys | |

| Patent/Pub No. | Date | Name |
|---|---|---|
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Petteersen et al. |
| 6,921,243 B2 | 7/2005 | Canini et al. |
| 6,931,834 B2 | 8/2005 | Jones |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,114,618 B2 | 10/2006 | Arnold |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krügen-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Sieffriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,621,404 B2 | 11/2009 | Murray |
| 7,687,932 B2 | 3/2010 | Casazza et al. |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2002/0150730 A1 | 10/2002 | De Luca et al. |
| 2002/0166860 A1 | 11/2002 | Giles et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Martinez |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0031832 A1 | 2/2005 | Kannankeril et al. |
| 2005/0082839 A1 | 4/2005 | McCoin |
| 2005/0155890 A1 | 7/2005 | Manuel |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |
| 2009/0302702 A1 | 12/2009 | Pabst et al. |
| 2010/0019502 A1 | 1/2010 | Pabst et al. |
| 2010/0026010 A1 | 2/2010 | Pabst |
| 2010/0117362 A1 | 5/2010 | Vihriala et al. |
| 2010/0123318 A1 | 5/2010 | Casazza et al. |

FOREIGN PATENT DOCUMENTS

| | | |
|---|---|---|
| CA | 2518742 | 9/2004 |
| EP | 1 829 762 | 9/2007 |
| FR | 2401091 | 3/1979 |
| GB | 191317268 | 0/1914 |
| GB | 859176 | 1/1961 |
| GB | 1524477 | 9/1978 |
| GB | 1537729 | 1/1979 |
| GB | 2041111 | 9/1980 |
| GB | 2050525 | 1/1981 |
| GB | 2075274 | 11/1981 |

| | | | | | |
|---|---|---|---|---|---|
| GB | 2131630 | 6/1984 | WO | 0017086 | 3/2000 |
| GB | 2144587 | 3/1985 | WO | 02/083523 | 10/2002 |
| GB | 2208243 | 3/1989 | WO | 2006/061806 | 6/2006 |
| GB | 2266937 | 11/1993 | | | |
| GB | 2372783 | 9/2002 | * cited by examiner | | |

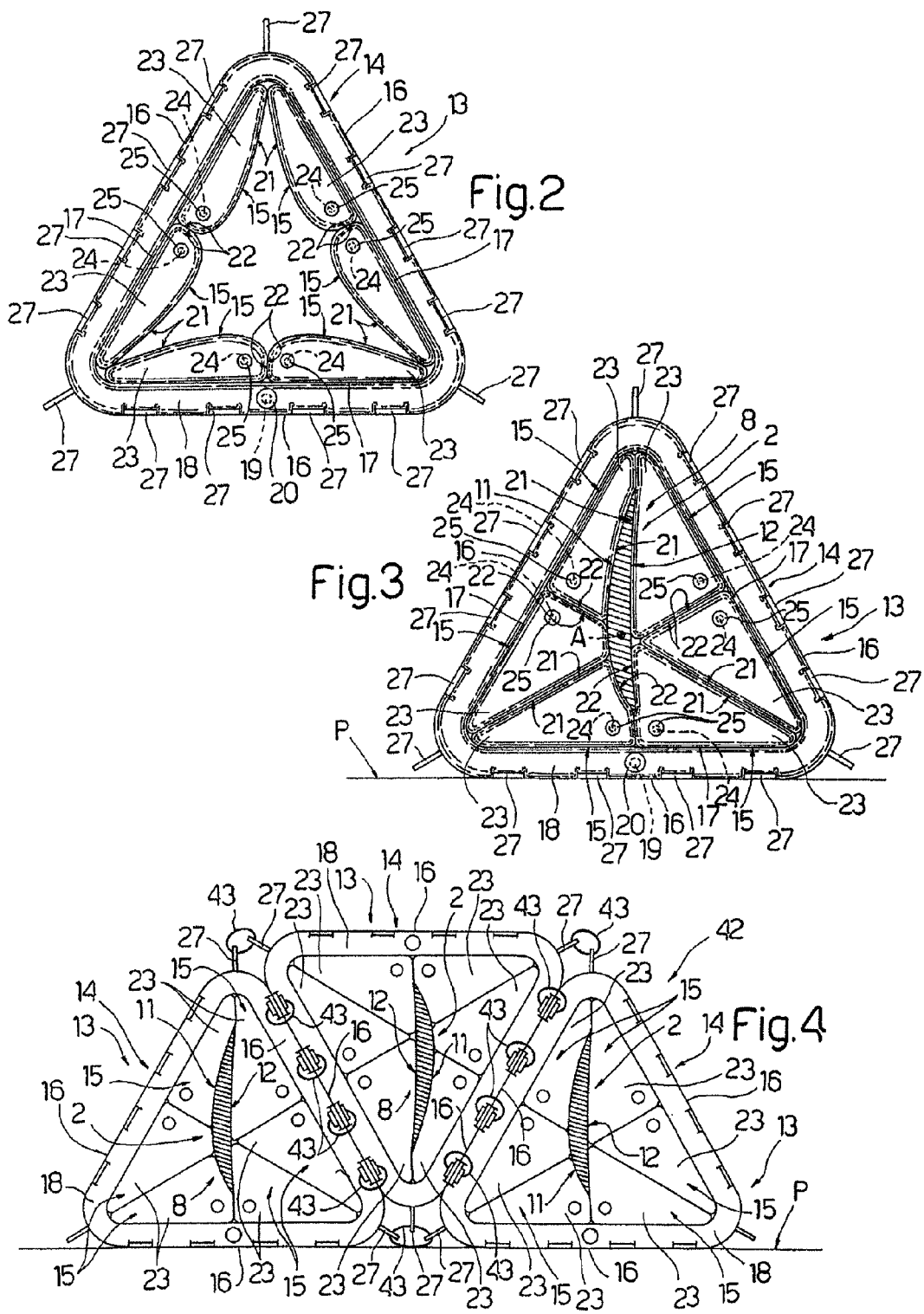

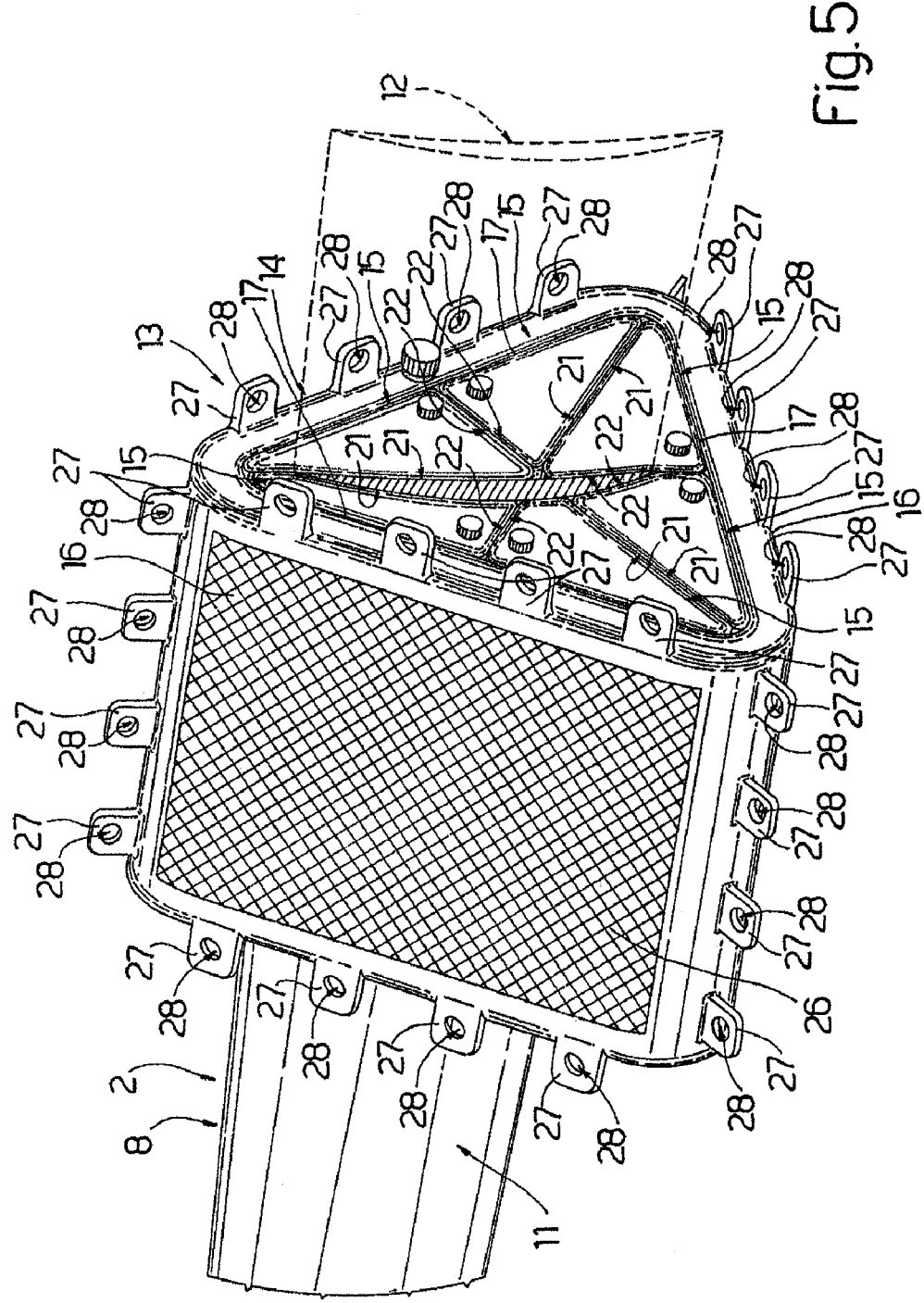

WIND POWER TURBINE BLADE PACKING AND PACKING METHOD

PRIORITY CLAIM

This application claims the benefit of and priority to Italian Patent Application No. MI2009A 000119, filed on Jan. 30, 2009, the entire contents of which are incorporated herein.

BACKGROUND

A wind power turbine blade is an elongated member comprising a metal structure embedded in a fiberglass shell. Currently used blades may be as long as 50 meters or 164 feet, and comprise, in succession, a connection, root, wing, and tip. The root of the blade has a substantially circular cross section that varies considerably along the blade axis, while the wing has a cross section in the form of a wing profile that varies considerably in shape and size along the blade axis.

Because of its shape and size, a wind power turbine blade is relatively difficult to pack and transport.

Accordingly, special packing has been devised for transporting, handling, and storing wind power turbine blades. For example, EP Patent Application No. 1,829,762 A1 relates to packing for transporting wind power turbine blades. Since a wind power turbine is normally equipped with three identical blades equally spaced about the hub rotation axis, the packing described in EP Patent Application No. 1,829,762 A1 is designed to house three blades, and substantially comprises a metal trellis structure that extends the full length of the blades and comprises three compartments, each for housing a respective blade.

However, the packing described in EP Patent Application No. 1,829,762 A1 has the drawback of being extremely heavy, bulky, and relatively expensive. Moreover, once the blades are delivered to the installation site, the packing must be returned to the manufacturing plant, the expense of which may be enormous, in view of the fact that blades are at times shipped to sites thousands of kilometers or miles from the manufacturing plant.

To reduce the size and weight of the packing, PCT Patent Application No. WO 2006/061806 A2 describes packing comprising small metal supporting structures placed only along given portions of the blades.

Additionally, U.S. Published Patent Application No. 2008/0107526 relates to packing for supporting one blade, and which comprises a metal container, and protective cushions between the metal container and the blade. The metal container comprises a universal joint, and serves to move the blade as it is assembled to the hub.

Though some of the these known types of packing are relatively small, they still only partly solve the problem of returning the packing, which still involves transporting relatively bulky metal structures at a relatively high cost.

Moreover, such known packing is difficult to apply to the blade/s, and must be applied with great care to avoid damaging the blades.

SUMMARY

The present disclosure relates to packing for wind power turbine blades. More specifically, the present disclosure relates to a packing, a protector or a transportor configured to support a wind power turbine blade, to facilitate transport of the blade, and to protect the blade from shock during transport.

One object of the present disclosure is to provide lightweight, compact packing for wind power turbine blades.

Another object of the present disclosure is to provide wind power turbine blade packing designed to reduce the cost of returning the packing.

Another object of the present disclosure is to provide wind power turbine blade packing that can be applied easily to the blade.

According to one embodiment of the present disclosure, there is provided packing for wind power turbine blades, the packing comprising at least one inflatable annular structure comprising at least one outer supporting wall (such as at least one flat outer supporting wall), and at least one inner clamping wall for clamping a blade in a given or designated position with respect to the outer supporting wall.

The inflatable annular structure is lightweight and compact, can be deflated to return the packing, and, when fully or partly deflated, can be fitted easily about the blade and then inflated to secure it to the blade, so the blade can be positioned much more easily with respect to it.

The inflatable annular structure is also extremely versatile, by adapting to the different cross sections of a given blade, and can be used for packing blades of different shapes and sizes and at different positions along the blade.

In one embodiment of the present disclosure, the inflatable annular structure comprises at least one inflatable outer bag comprising the outer supporting wall and at least one inflatable inner bag comprising the inner clamping wall.

The inflatable outer and/or inner bag may thus be inflated selectively to simplify assembly of the packing to the blade. Accordingly, it should be appreciated that the present disclosure provides a packing, a protector or a transportor with a conformable or compressible engagement surface with adapts to the shape and size of the blade.

In another embodiment of the present disclosure, the inflatable outer bag comprises a plurality of substantially flat, adjacent outer supporting walls.

In this embodiment, a designated outer supporting wall can be selected, and the other outer supporting walls can be used for supporting other inflatable annular structures.

Another object of the present disclosure is to provide an easy method of packing wind power turbine blades.

According to one embodiment of the present disclosure, there is provided a method of packing wind power turbine blades, the method comprising the steps of applying at least one inflatable annular structure about a blade, and inflating the inflatable annular structure to distend an outer supporting wall (such as a flat outer supporting wall), and an inner clamping wall for clamping the blade.

Additional features and advantages are described in, and will be apparent from, the following Detailed Description and the figures.

BRIEF DESCRIPTION OF THE DRAWINGS

A number of non-limiting embodiments of the present disclosure will be described by way of example with reference to the accompanying drawings, in which:

FIGS. 2 and 3 show larger-scale end views, with parts removed for clarity, of an inflatable annular structure of the FIG. 1 packing;

FIG. 4 shows an end view, with parts removed for clarity, of a packing assembly comprising three connected packings;

FIG. 5 shows a larger-scale isometric view, with parts removed for clarity, of the inflatable annular structure in FIG. 3.

DETAILED DESCRIPTION

Figure 1:
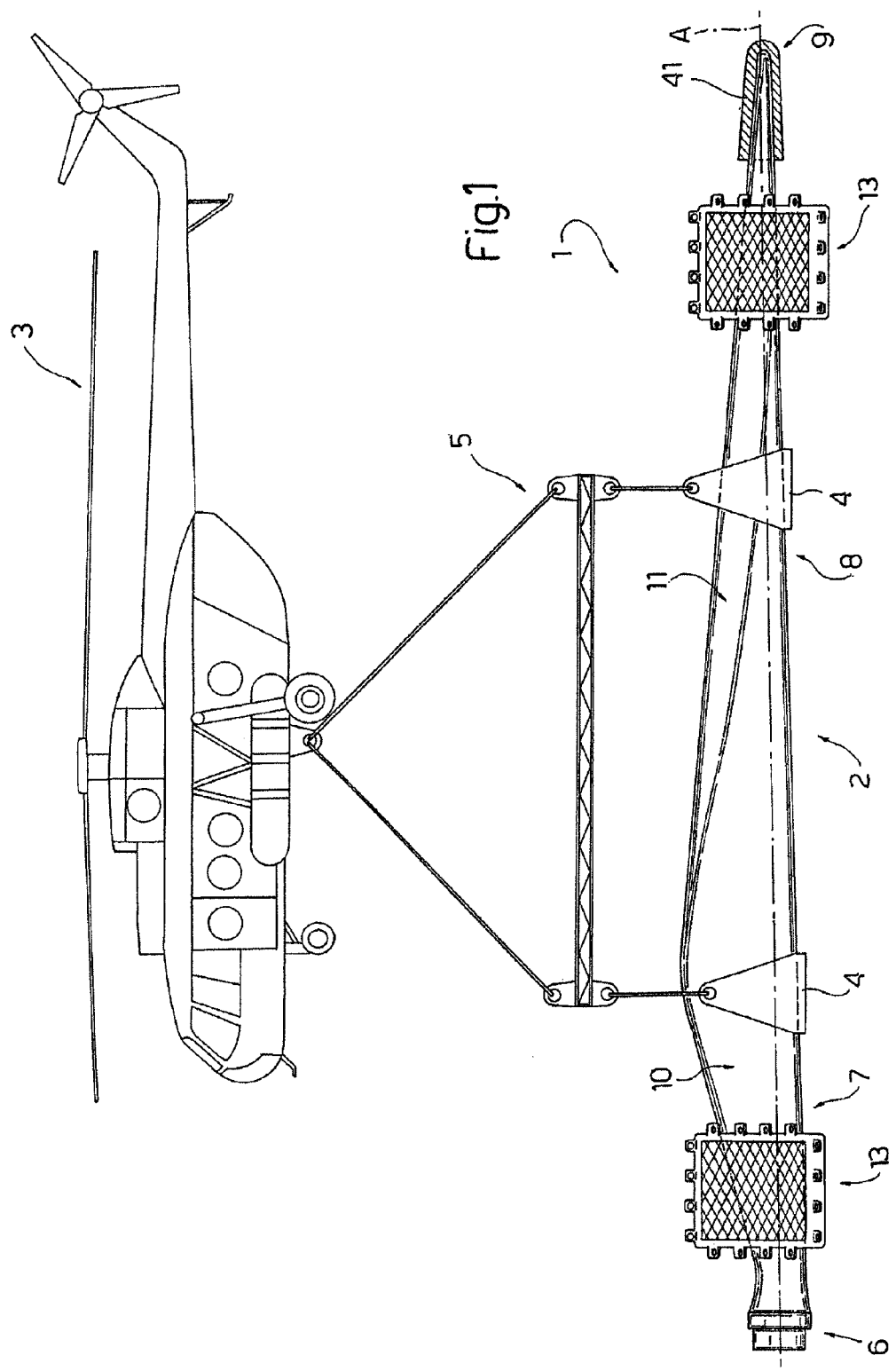
FIG. 1 shows a side view, with parts removed for clarity, of a blade being transported in wind power turbine blade packing in accordance with one embodiment of the present disclosure.

Referring now to the example embodiments of the present disclosure illustrated in FIGS. 1 to 7, number 1 in FIG. 1 indicates as a whole a packing, a protector or a transportor for a blade 2 of a known wind power turbine (not shown in the drawings).

A known wind power turbine (not shown in the drawings), normally comprises a blade assembly comprising a hub fitted with three blades equally spaced bout the hub rotation axis.

In the FIG. 1 example, blade 2 is suspended from a helicopter 3 by two slings 4 and a hitch device 5.

Blade 2 extends along a longitudinal axis A, and comprises, from left to right in FIG. 1, a connection 6, a root 7, and a wing 8 terminating in a tip 9. Connection 6 has a substantially circular cross section, root 7 has a circular cross section varying along longitudinal axis A, and wing 8 has a cross section in the form of a wing profile that varies in size along longitudinal axis A.

Root 7 has an annular face 10, and wing 8 has two faces 11, 12 (FIG. 5) extending between root 7 and tip 9.

Connection 6 comprises flanges, and a toothed ring nut forming a pitch control mechanism (not shown) to control the orientation of blade 2 about axis A when blade 2 is fitted to the hub. Blade 2 comprises a metal structure, and a fiberglass shell covering the metal structure, except for connection 6.

In the FIG. 1 example, packing 1 comprises two inflatable annular structures 13, one applied about root 7, and the other about wing 8.

Each inflatable annular structure 13 is a load-bearing structure capable of supporting the weight of blade 2 and keeping blade 2 raised off a supporting surface P (FIG. 3).

With reference to FIG. 2, each inflatable annular structure 13 comprises an annular inflatable outer bag 14, and six inflatable inner bags 15. Inflatable outer bag 14 is described in the distended configuration (i.e., inflated with gas, such as air) and comprises three adjacent outer supporting walls 16 which, in use, impart to inflatable annular structure 13 the shape of a triangular-ended prism, the lateral walls of which are defined by outer supporting walls 16. Inflatable outer bag 14 also comprises three intermediate walls 17, each parallel to and facing a respective supporting wall 16, two end walls 18 (only one shown in FIG. 2) connecting supporting walls 16 to intermediate walls 17, a valve 19 for feeding gas into and expelling gas from inflatable outer bag 14, and a cap 20 for closing valve 19. Each inflatable inner bag 15 extends along an intermediate wall 17. In the example shown, each intermediate wall 17 also defines a wall of an inflatable inner bag 15. And at least two adjacent inflatable inner bags 15 extend along each intermediate wall 17.

With reference to FIG. 3, in addition to a portion of intermediate wall 17, each inflatable inner bag 15 also comprises two adjacent inner clamping walls 21, 22 parallel to axis A, two end walls 23 (only one shown in FIG. 3) perpendicular to axis A, a valve 24, and a cap 25.

With reference to FIG. 5, outer supporting walls 16 comprise reinforcing panels 26, such as reinforcing panels made of rubber, to also prevent inflatable annular structure 13 from slipping on supporting surface P (FIG. 3).

Each inflatable annular structure 13 comprises one or more connectors, (such as flaps 27 in which reinforced-edged eyelets 28 are formed) which extend along the edges of each outer supporting wall 16 to connect one inflatable annular structure 13 to an adjacent inflatable annular structure 13, as shown in FIG. 4.

In actual use, and with reference to FIGS. 3 and 5, inflatable outer bag 14 defines the shape of inflatable annular structure 13, and in particular of outer supporting walls 16, while inner bags 15 clamp and lock blade 2 in a given position with respect to inflatable outer bag 14, and in particular with respect to outer supporting walls 16.

More specifically, when inflatable inner bags 15 are inflated, inner clamping walls 21, 22 gradually move into position contacting faces 11 and 12 of wing 8 or the inner clamping walls 21, 22 of the adjacent inflatable inner bags 15.

When inflatable annular structure 13 is fitted about root 7, inflatable inner bags 15 adapt to the shape of root 7 and assume a different shape from the one shown in FIGS. 3 and 5.

Figure 6:
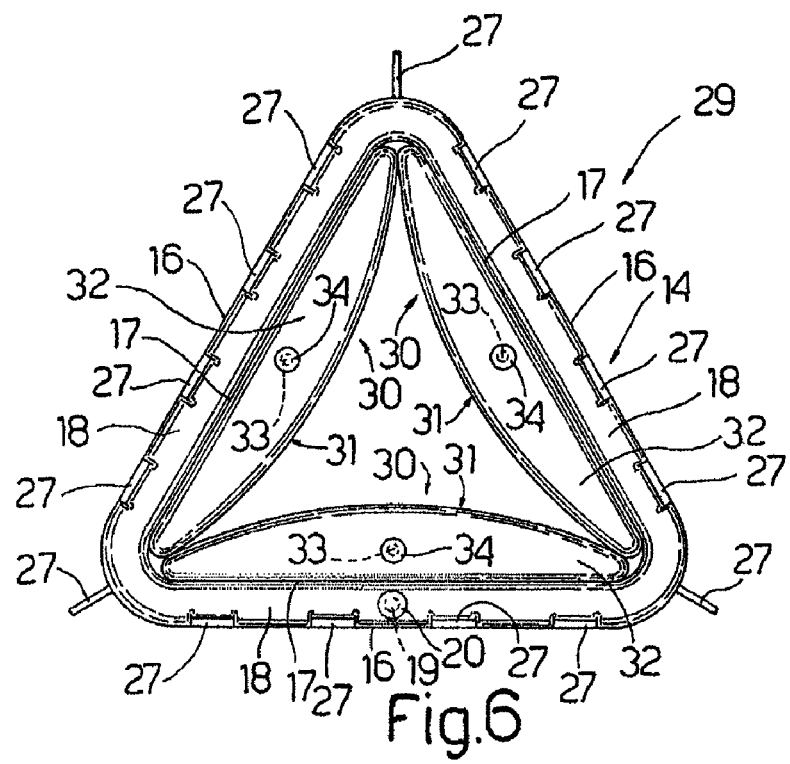
FIGS. 6 and 7 show end views, with parts removed for clarity, of two alternative embodiments of inflatable annular structures in accordance with the present disclosure.

With reference to FIG. 6, number 29 indicates an inflatable annular structure comprising an annular inflatable outer bag 14, and three inflatable inner bags 30, each comprising an inner clamping wall 31, two end walls 32 (only one shown in FIG. 6), a valve 33, and a cap 34.

Figure 7:
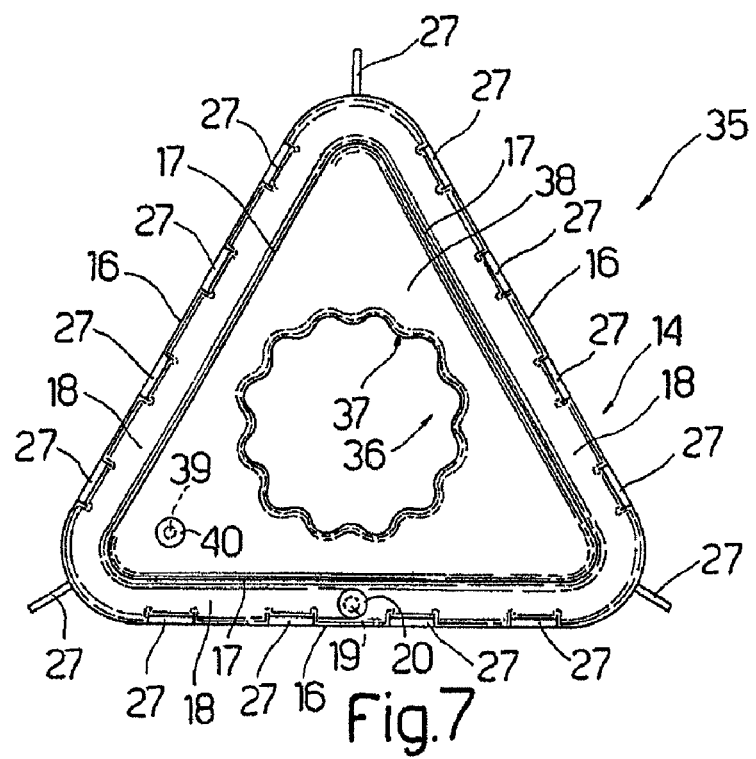

With reference to FIG. 7, number 35 indicates an inflatable annular structure comprising an annular inflatable outer bag 14, and an annular inflatable inner bag 36 comprising an annular inner clamping wall 37, two end walls 38 (only one shown in FIG. 7), a valve 39, and a cap 40.

Inflatable annular structures 29 and 35 are particularly suitable for clamping blade 2 at root 7. Though inflatable annular structures 13, 29, 35 differ as to the shape and number of respective inflatable inner bags 15, 30, 36, and each is preferable to the others in certain applications, inflatable annular structures 13, 29, 35 are interchangeable.

Like inflatable annular structures 13, inflatable annular structures 29 and 35 also comprise one or more connectors, such as flaps 27 with reinforced-edged eyelets 28.

With reference to FIG. 1, in addition to inflatable annular structures 13, packing 1 comprises a cover 41 for protecting tip 9 of blade 2, and which is in the form of a cap and also inflatable.

In one alternative embodiment of the present disclosure (not shown), the packing comprises further inflatable covers placed along other portions of the blade to protect the blade from shock.

Number 42 in FIG. 4 indicates a packing assembly for three blades 2 packed in respective inflatable annular structures 13 fixed to one another.

In the FIG. 4 example, two inflatable annular structures 13 rest on a supporting surface P along two respective outer supporting walls 16, and a third inflatable annular structure 13 rests on the other two inflatable annular structures 13. Because inflatable annular structures 13 are prism-shaped with triangular, such as isosceles triangular, ends, two side by side inflatable annular structures 13 form a gap complementary to the inverted third inflatable annular structure 13, two outer supporting walls 16 of which rest on two sloping outer supporting walls 16 of the other two inflatable annular structures 13.

The three inflatable annular structures 13 are connected to one another by rings 43 or ropes (not shown) through adjacent eyelets 28 of adjacent inflatable annular structures 13. Packing assemblies of different shapes can thus be formed comprising at least two connected inflatable annular structures 13.

The wind power turbine blade packing method comprises the steps of placing at least two inflatable annular structures 13 about a blade 2, and inflating each inflatable annular structure 13 to distend outer supporting walls 16, and inner clamping walls 21 or 22 for clamping blade 2.

In one embodiment, the method comprises the step of inflating inflatable outer bag 14 first, and then inflatable inner bags 15. More specifically, the method of this embodiment comprises the step of positioning inflatable annular structure 13 about blade 2 before inflating inflatable inner bags 15, and after inflating inflatable outer bag 14, so as to set supporting walls 16 in a given position with respect to blade 2.

The method also comprises the step of placing inflatable annular structure 13 about blade 2 at a given point along axis A of blade 2, before inflating inflatable inner bags 15 and after inflating inflatable outer bag 14.

Once positioned correctly with respect to blade 2, inflatable annular structure 13 is locked about blade 2 by inflating inflatable inner bags 15, such as simultaneously.

The same packing method also applies to fitting inflatable annular structures 29 and 35 to blade 2.

The present disclose has numerous advantages: packing, protector or transportor 1 substantially comprises lightweight, compact, relatively low-cost inflatable annular structures, the inflatable annular structures defining the packing can be salvaged and deflated to drastically reduce volume for transport from the blade installation site back to the blade manufacturing plant, and the packing is configured to adapt to the shape of the blade, so it can be used for blades of different shapes and sizes. The clamping walls, in fact, mold to the shape of the blade, which makes the packing extremely versatile. Moreover, when fully or partly deflated, the annular structures can be placed relatively easily about the blade, and then inflated to fix them to the blade.

The packing in general may comprise one or a number of variously combined inflatable annular structures 13, 29, 35.

In another embodiment (not shown), inflatable annular structures 13, 29, 35 are relatively long, so that one inflatable annular structure 13, 29, 35 is enough to support blade 2.

Using a plurality of inflatable annular structures, it is possible to cover the whole length of the blade.

It should be understood that various changes and modifications to the presently preferred embodiments described herein will be apparent to those skilled in the art, for example, to the shape of the inflatable annular structures or to the means of connecting them. Such changes and modifications can be made without departing from the spirit and scope of the present subject matter and without diminishing its intended advantages. It is therefore intended that such changes and modifications be covered by the appended claims.

The invention is claimed as follows:

1. A wind power turbine blade packing comprising:
at least one inflatable annular structure including:
at least one outer supporting wall, and
at least one inner clamping wall configured to clamp a blade in a designated position with respect to the at least one outer supporting wall, wherein the at least one inflatable annular structure includes at least one inflatable outer bag which defines said at least one outer supporting wall and at least one inflatable inner bag which defines said at least one inner clamping wall.

2. The wind power turbine blade packing of claim 1, wherein the at least one inflatable outer bag includes a plurality of substantially flat, adjacent outer supporting walls.

3. The wind power turbine blade packing of claim 1, wherein the at least one inflatable outer bag and the at least one inflatable inner bag define a shared intermediate wall.

4. The wind power turbine blade packing of claim 1, wherein the at least one inflatable annular structure includes a plurality of inflatable inner bags, each inflatable inner bag at least partially defining said at least one inner clamping wall.

5. The wind power turbine blade packing of claim 1, wherein the at least one inflatable annular structure includes at least one connector configured to connect said at least one inflatable annular structure to an adjacent inflatable annular structure.

6. The wind power turbine blade packing of claim 5, wherein said at least one connector includes a plurality of flaps each having an eyelet configured to be connected by at least one of: a ring and a rope.

7. The wind power turbine blade packing of claim 1, which includes a plurality of inflatable annular structures configured to fit about one blade.

8. The wind power turbine blade packing of claim 1 which includes at least one cover configured to cover and protect the blade.

9. The wind power turbine blade packing of claim 8, wherein said cover is configured to inflate.

10. The wind power turbine blade packing of claim 1, which includes a plurality of inflatable annular structures, wherein a first and second blade are supported by respective ones of said inflatable annular structures and the inflatable annular structure of the first blade is connected to the inflatable annular structure of the second blade.

11. The wind power turbine blade packing of claim 1, wherein the at least one outer supporting wall of the at least one inflatable annular structure is flat.

12. A method of packing wind power turbine blades, the method comprising:
applying at least one inflatable annular structure about a blade, the at least one inflatable annular structure includes at least one inflatable outer bag which defines at least one outer supporting wall, and at least one inflatable inner bag which defines at least one inner clamping wall, and
causing the at least one inflatable annular structure to inflate to distend the at least one outer supporting wall and the at least one inner clamping wall to clamp the blade, wherein causing the at least one inflatable annular structure to inflate includes causing the at least one inflatable outer bag to inflate before causing the at least one inflatable inner bag to inflate.

13. The method of claim 12, which includes orienting the at least one inflatable annular structure about the blade after causing the at least one inflatable outer bag to inflate and before causing the at least one inflatable inner bag to inflate to set the at least one outer supporting wall and the at least one inner clamping wall to respective designated positions with respect to the blade.

14. The method of claim 12, which includes maintaining the at least one inflatable annular structure in a designated position with respect to the blade when causing the at least one inflatable inner bag to inflate to lock the at least one inflatable annular structure with respect to the blade in said designated position.

15. The method of claim 12, wherein the at least one outer supporting wall of the at least one inflatable annular structure is flat.

16. A wind power turbine blade packing comprising:
a plurality of inflatable annular structures configured to fit about one blade, wherein each inflatable annular structure includes:
at least one outer supporting wall, and
at least one inner clamping wall configured to clamp the blade in a designated position with respect to the at least one outer supporting wall.

17. A wind power turbine blade packing comprising:
a plurality of inflatable annular structures, wherein a first blade is supported by one of said inflatable annular structures, a second blade is supported by another one of said inflatable annular structures, the inflatable annular structure of the first blade is connected to the inflatable annular structure of the second blade and each of the inflatable annular structures includes:
at least one outer supporting wall, and
at least one inner clamping wall configured to clamp one of the blades in a designated position with respect to the at least one outer supporting wall.

* * * * *